United States Patent
Shen

(10) Patent No.: US 9,990,280 B2
(45) Date of Patent: Jun. 5, 2018

(54) METHODS FOR READING DATA FROM A STORAGE UNIT OF A FLASH MEMORY AND APPARATUSES USING THE SAME

(71) Applicant: Silicon Motion, Inc., Jhubei (TW)

(72) Inventor: Yang-Chih Shen, Taipei (TW)

(73) Assignee: Silicon Motion, Inc., Jhubei (TW)

( * ) Notice: Subject to any disclaimer, the term of this patent is extended or adjusted under 35 U.S.C. 154(b) by 196 days.

(21) Appl. No.: 14/702,392

(22) Filed: May 1, 2015

(65) Prior Publication Data

US 2016/0239416 A1  Aug. 18, 2016

(30) Foreign Application Priority Data

Feb. 17, 2015 (TW) .............................. 104105515 A

(51) Int. Cl.
G06F 12/00 (2006.01)
G06F 12/02 (2006.01)

(52) U.S. Cl.
CPC .. *G06F 12/0246* (2013.01); *G06F 2212/1041* (2013.01); *G06F 2212/7203* (2013.01)

(58) Field of Classification Search
None
See application file for complete search history.

(56) References Cited

U.S. PATENT DOCUMENTS

| | | |
|---|---|---|
| 2008/0195800 A1 | 8/2008 | Lee et al. |
| 2009/0319871 A1 | 12/2009 | Shirai et al. |
| 2011/0055456 A1* | 3/2011 | Yeh ..................... G06F 12/0862 711/103 |
| 2011/0219179 A1 | 9/2011 | Lee |
| 2014/0104947 A1 | 4/2014 | Yamauchi et al. |
| 2014/0149646 A1 | 5/2014 | Im |
| 2016/0179682 A1* | 6/2016 | Moretti ............... G06F 12/0871 711/125 |

FOREIGN PATENT DOCUMENTS

| | | |
|---|---|---|
| JP | 2000-251484 A | 9/2000 |
| TW | 201421238 A | 6/2014 |
| TW | 201438020 A | 10/2014 |

OTHER PUBLICATIONS

Office Action of corresponding TW application, published on May 18, 2016.

* cited by examiner

*Primary Examiner* — Baboucarr Faal
(74) *Attorney, Agent, or Firm* — Wang Law Firm, Inc.

(57) ABSTRACT

A method for reading data from a storage unit of a flash memory, performed by a processing unit, including at least the following steps: A first read command is received from a master device via a first access interface. It is determined whether data requested by the first read command has been cached in a first buffer, which caches continuous data obtained from a storage unit. A second access interface is directed to read the data requested by the first read command from the storage unit and store the read data in a second buffer and the first access interface is directed to read the data requested by the first read command from the second buffer and clock the read data out to the master device when data requested by the first read command has not been cached in the first buffer.

18 Claims, 6 Drawing Sheets

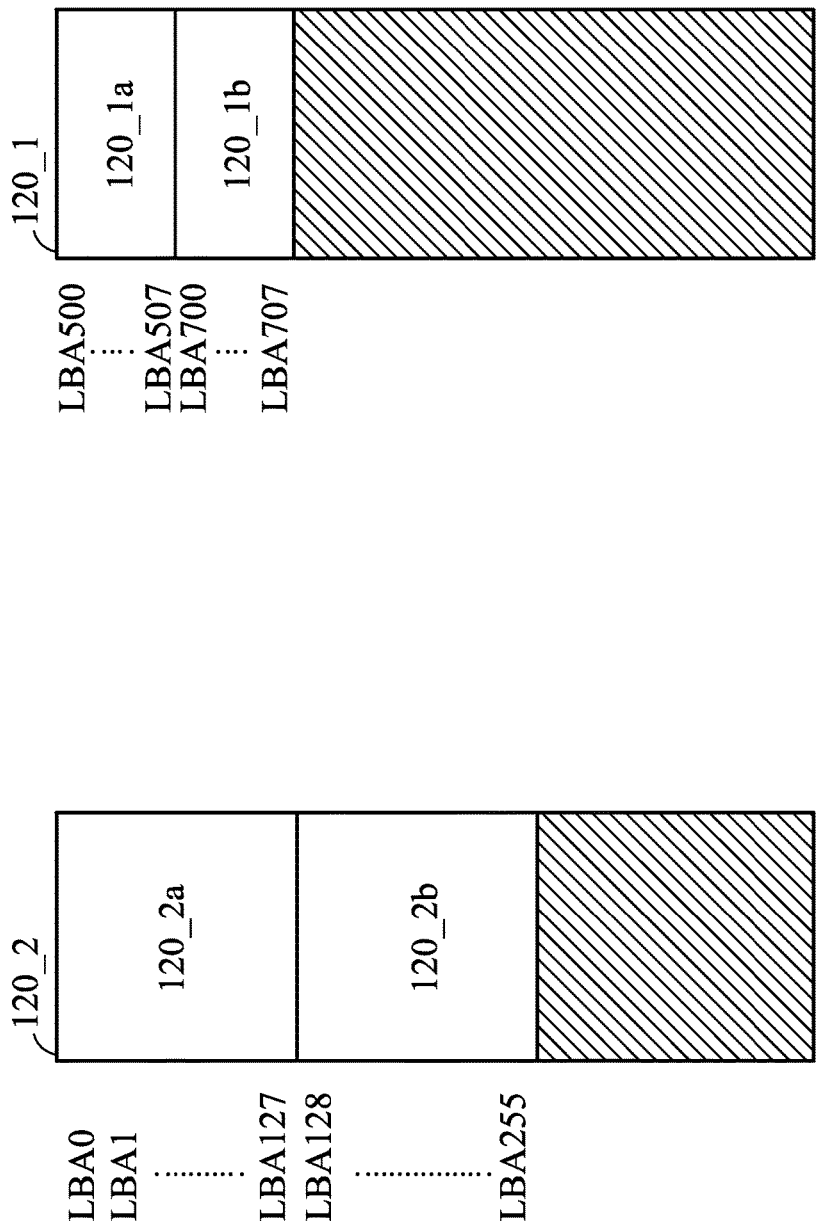

METHODS FOR READING DATA FROM A STORAGE UNIT OF A FLASH MEMORY AND APPARATUSES USING THE SAME

CROSS REFERENCE TO RELATED APPLICATIONS

This application claims priority of Taiwan Patent Application No. 104105515, filed on Feb. 17, 2015, the entirety of which is incorporated by reference herein.

BACKGROUND

1. Technical Field

The present invention relates to flash memory, and in particular to methods for reading data from a storage unit of a flash memory and apparatuses using the same.

2. Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal. Accordingly, what is needed are methods for reading data from a storage unit of a flash memory and apparatuses that use these methods to improve the data read efficiency.

BRIEF SUMMARY

An embodiment of the invention introduces a method for reading data from a storage unit of a flash memory, performed by a processing unit, including at least the following steps. A first read command is received from a master device via a first access interface. It is determined whether data requested by the first read command has been cached in a first buffer, where the first buffer caches continuous data obtained from a storage unit. A second access interface is directed to read the data requested by the first read command from the storage unit and store the read data in a second buffer and the first access interface is directed to read the data requested by the first read command from the second buffer and clock the read data out to the master device when data requested by the first read command has not been cached in the first buffer.

An embodiment of the invention introduces an apparatus for reading data from a storage unit of a flash memory including at least a first access interface coupled to a master device, a second access interface coupled to a storage unit, a first buffer caching continuous data obtained from the storage unit, and a processing unit. The processing unit, coupled to the first access interface, the second access interface and the first buffer, receives a first read command from the master device via the first access interface; determines whether data requested by the first read command has been cached in the first buffer; and, when data requested by the first read command has not been cached in the first buffer, directs the second access interface to read the data requested by the first read command from the storage unit and store the read data in a second buffer, and directs the first access interface to read the data requested by the first read command from the second buffer and clock the read data out to the master device.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

FIGS. 4A and 4B are schematic diagrams of cached data of a buffer according to an embodiment of the invention.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
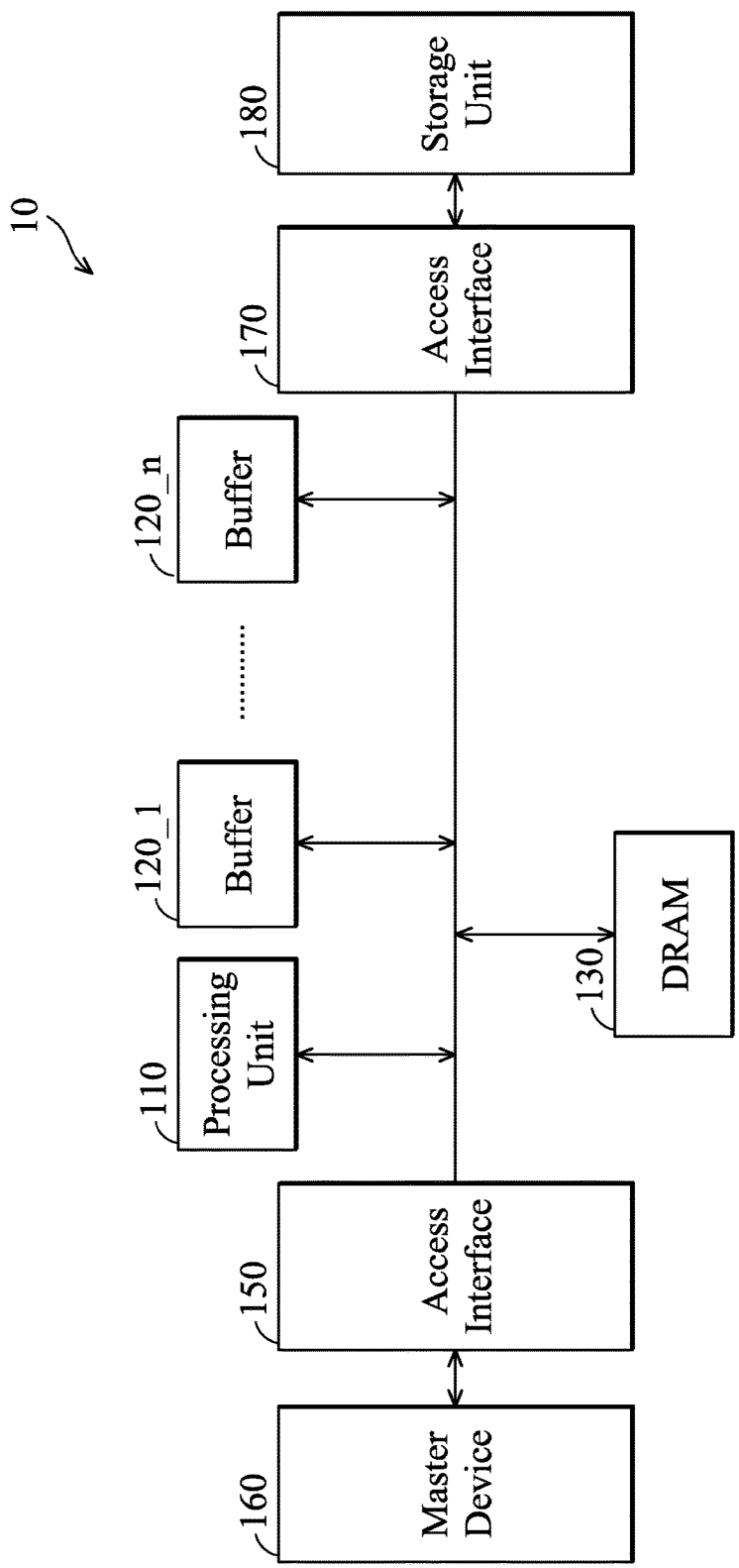
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 180 through an access interface 170 and reads data from a designated address thereof through the same interface 170."

The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a DDR (Double Data Rate) protocol, such as ONFI (open NAND flash interface), DDR toggle, or others. The processing unit 110 may communicate with a host 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
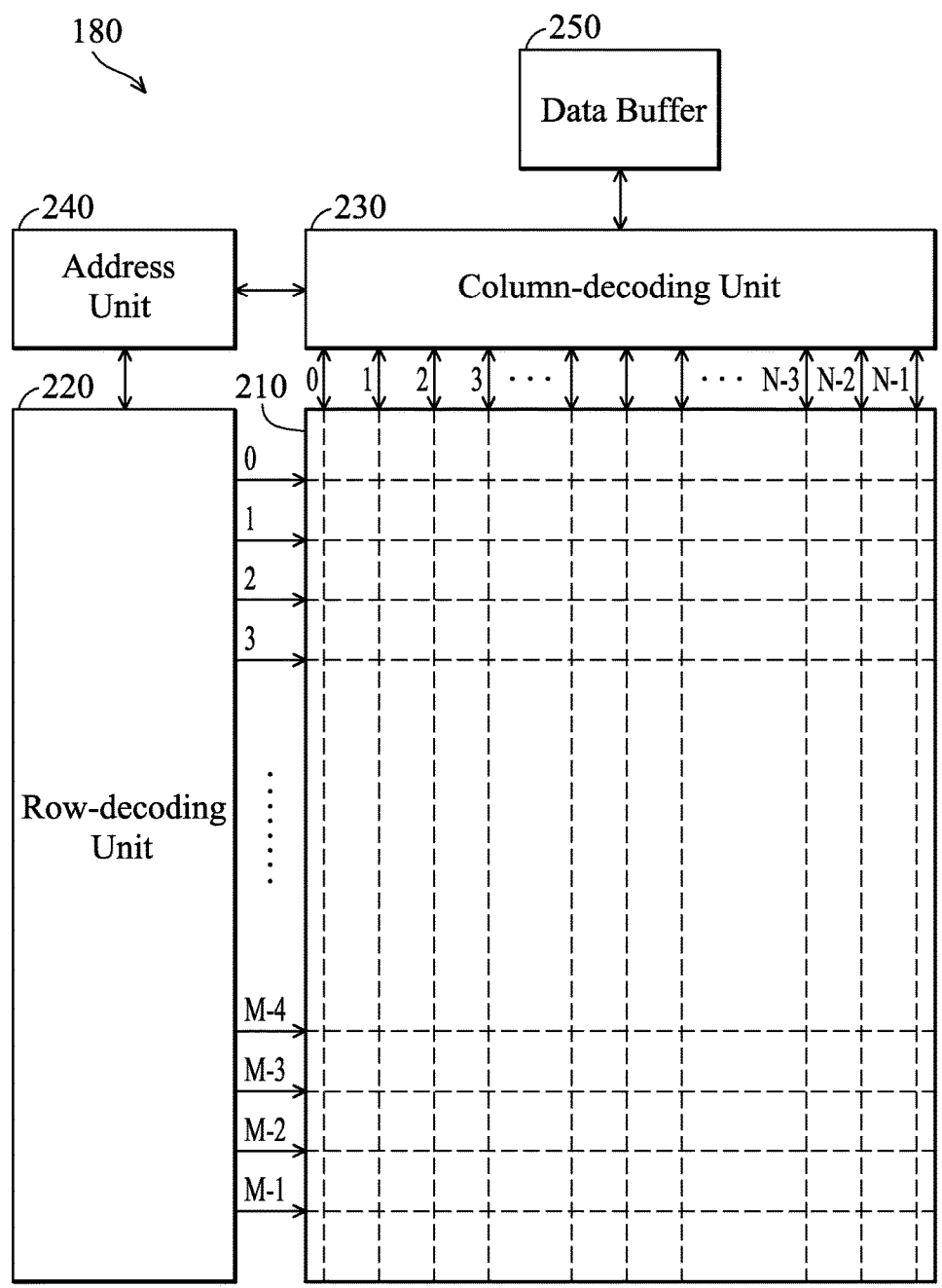
FIG. 2 shows a schematic diagram depicting a storage unit of a flash memory according to an embodiment of the invention.

FIG. 2 shows a schematic diagram depicting a storage unit of a flash memory according to an embodiment of the invention. The storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

In some implementations, a flash memory device installs a single buffer. A processing unit typically determines whether the recently received read command in conjunction with the previously received commands forms a continuous read. If so, in addition to the data requested by the recently received read command, more data is read and cached in this buffer. Subsequently, when receiving a request for reading data which has been cached in the buffer from a master device, the processing unit reads the requested data from the buffer and clocks the read data out. The master device may issue a read command Read(LBA,sec_count) for requesting data of a storage unit, where the parameter "LBA" indicates a start logical block address and the parameter "sec_count" indicates a total count for reading continuous blocks. For example, when continuously receiving two read commands Read(0,5) and Read(5,5) for requesting data of five blocks from LBA 0 and another five blocks from LBA 5, respectively, the processing unit determines whether a continuous read happens first. When a continuous read is formed, in addition to the requested ten blocks of data, the processing unit further reads 128 blocks from LBA 11 from a storage unit and stores the extra read data in the buffer. Next, when receiving a request for reading five blocks from LBA 12 from the master device, the processing unit acquires data directly from the buffer and clocks the acquired data out to the master device. However, in the configuration of the single buffer, when receiving a request for reading data other than that cached in the buffer from the master device, for example, reading 128 blocks of data from LBA 500, the processing unit has to read data from the storage unit and stores the read data in the buffer, which overwrites the previously cached data. Next, when receiving a request for reading five blocks from LBA 20 from the master device, the processing unit has to re-acquire the requested data from the storage unit because the previously cached data has been overwritten.

Figure 3:
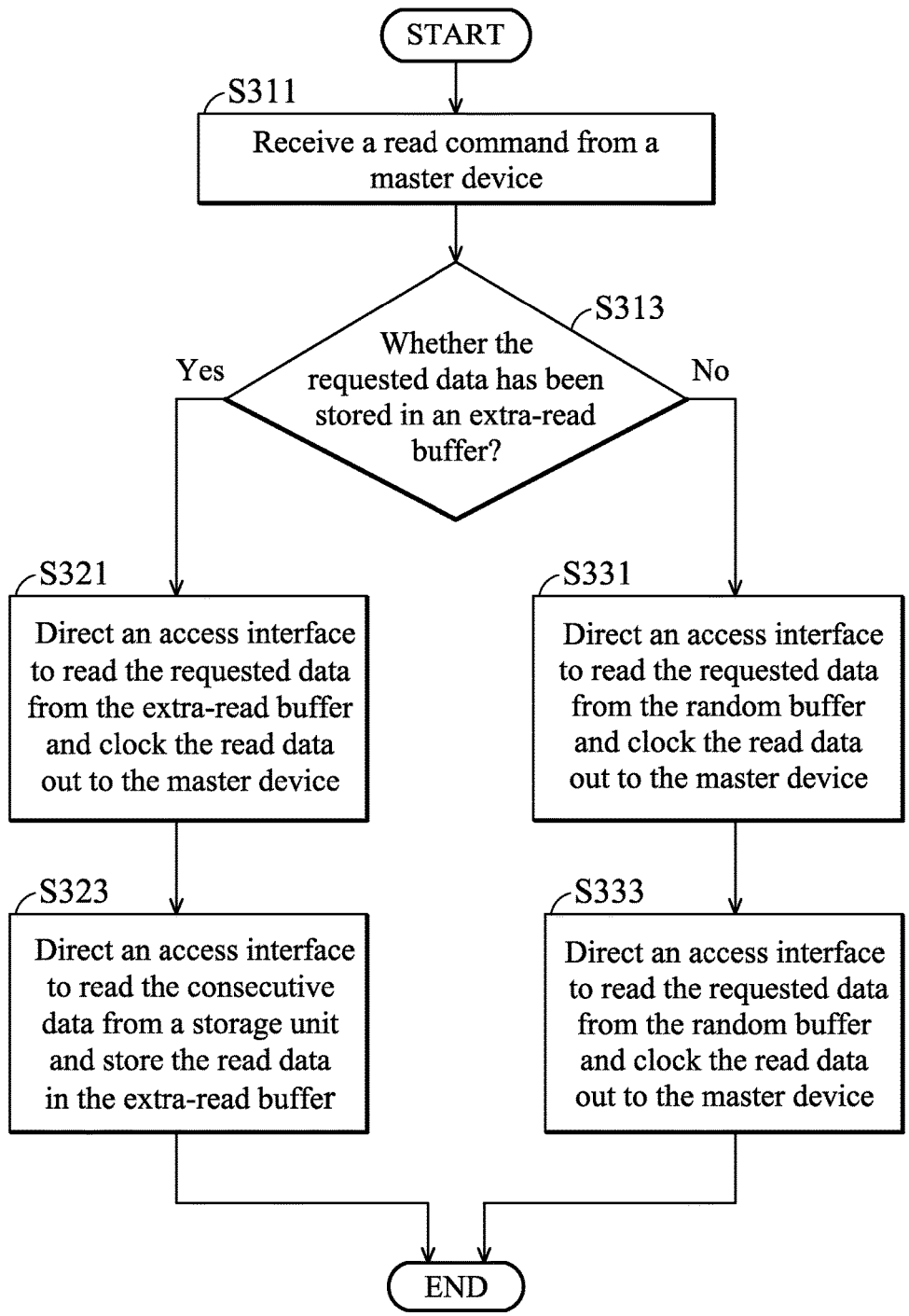
FIG. 3 is a flowchart illustrating a method for reading data, performed by the processing unit 110, according to an embodiment of the invention.

In order to address the problem that happens in the aforementioned implementations, the system architecture 10 of the flash memory may contain several buffers 120_1 to 120_n, where n is an integer being greater than or equal to two. In an embodiment, the system architecture 10 may contain two buffers 120_1 and 120_n, where one is configured as a random buffer; the other is configured as an extra-read buffer. The extra-read buffer is used to store continuous data, such as data from LBA 0 to LBA 1023 while the random buffer is used to store fragment data. Although the following embodiments describe the details of data read, the random buffer may be configured as an Rx (Reception) buffer or a Tx/Rx (Transmission/Reception) buffer, and the invention should not be limited thereto. A DRAM (Dynamic Random Access Memory) 130 stores information regarding the cached data of the extra-read buffer that is originally associated with addresses such as LBA x to y, where x and y is an arbitrary integer ranging from 0 to 65535. FIG. 3 is a flowchart illustrating a method for reading data, performed by the processing unit 110, according to an embodiment of the invention. First, the processing unit 110 receives a read command from the master device 160 via the access interface 150 (step S311). Subsequently, it is determined whether the requested data has been stored in the extra-read buffer (step S313). The processing unit 110 may check information stored in the DRAM 130 to realize the aforementioned determination. If any requested data read addresses fall within the LBAs for the extra-read buffer, which is stored in the DRAM 130, then the processing unit 110 determines that the requested data has been stored in the extra-read buffer. If so (the "Yes" path of step S313), the access interface 150 is directed to read the requested data from the extra-read buffer and clock the read data out to the master device 160 (step S321), and the access interface 170 is directed to read the consecutive data from the storage unit 180 and store the read data in the extra-read buffer (step S323). Step S323 is an extra-read operation to fully utilize the bandwidth of the access interface 170 to read data in advance, which has not been requested by the master device 160. In addition, the extra-read operation of step S323 may store an amount of data which is allowed to be stored in the extra-read buffer in advance. In other words, if the extra-read buffer is full, the extra-read operation will not be executed. If not (the "No" path of step S313), the access interface 170 is directed to read the requested data from the storage unit 180 and store the read data in the random buffer (step S331) and the access interface 150 is directed to read the requested data from the random buffer and clock the read data out to the master device 160 (step S333).

The following introduces examples to illustrate the method as shown in FIG. 3. FIGS. 4A and 4B are schematic diagrams of cached data of a buffer according to an embodiment of the invention. Assume buffers 120_1 to 120_2 are configured as a random buffer and an extra-read buffer. It should be noted that the buffers 120_1 and 120_2 may be two physically separated memories or two continuous spaces of a physical memory, which are logically allocated. Initially, a region 120_1a of the random buffer 120_1 caches data of LBAs 500 to 507 of the storage unit 180 while a region 120_2a of the extra-read buffer 120_2 caches data of LBAs 0 to 127 of the storage unit 180. At moment t1, the processing unit 110 receives a read command Read(100,8) from the master device 160 via the access interface 150 (step S311). After determining that the requested data has been cached in the extra-read buffer 120_2 (the "Yes" path of step S313), the processing unit 110 reads the requested data of LBAs 100 to 107 from the region 120_2a and directs the access interface 150 to clock the read data out to the master device 160 (step S321) and directs the access interface 170 to read 128 blocks following data of LBA 127, that is, data of LBAs 128 to 255, and stores the read data in a region 1202b (step S323). It should be noted that operations on the access interface 150 may be partially parallel to that on the access interface 170. That is, the processing unit 110 may clock data out to the master device 160 via the access interface 150 and simultaneously read the consecutive data from the storage unit 180 via the access interface 170. At moment t2, the processing unit 110 receives a read command Read(700,8) from the master device 160 via the access interface 150 (step S311). After determining that the requested data has not been cached in the extra-read buffer 120_2 (the "No" path of step S313), the processing unit 110 directs the access interface 170 to read the requested data of LBAs 700 to 707 and stores the read data in the region 120_1b (step S331) and subsequently reads the requested data of LBAs 700 to 707 from the region 120_1b and directs the access interface 150 to clock the read data out to the master device 160 (step S333). At moment t3, after receiving a read command Read(108,8) from the master device 160 via the access interface 150 (step S311), the processing unit 110 reads the requested data of LBAs 108 to 115 from the region 120_2a and directs the access interface 150 to clock the read data out to the master device 160 (step S321) and directs the access interface 170 to read 128 blocks following data of LBA 255, that is, data of LBAs 256 to 383, and stores the read data in available space of the region 120_2b (step S323). By the illustrated examples above, it should be understood that, although any read command is inserted between read commands for reading continuous data, data pre-cached in the extra-read buffer 1202 will not be overwritten.

Figure 5A:
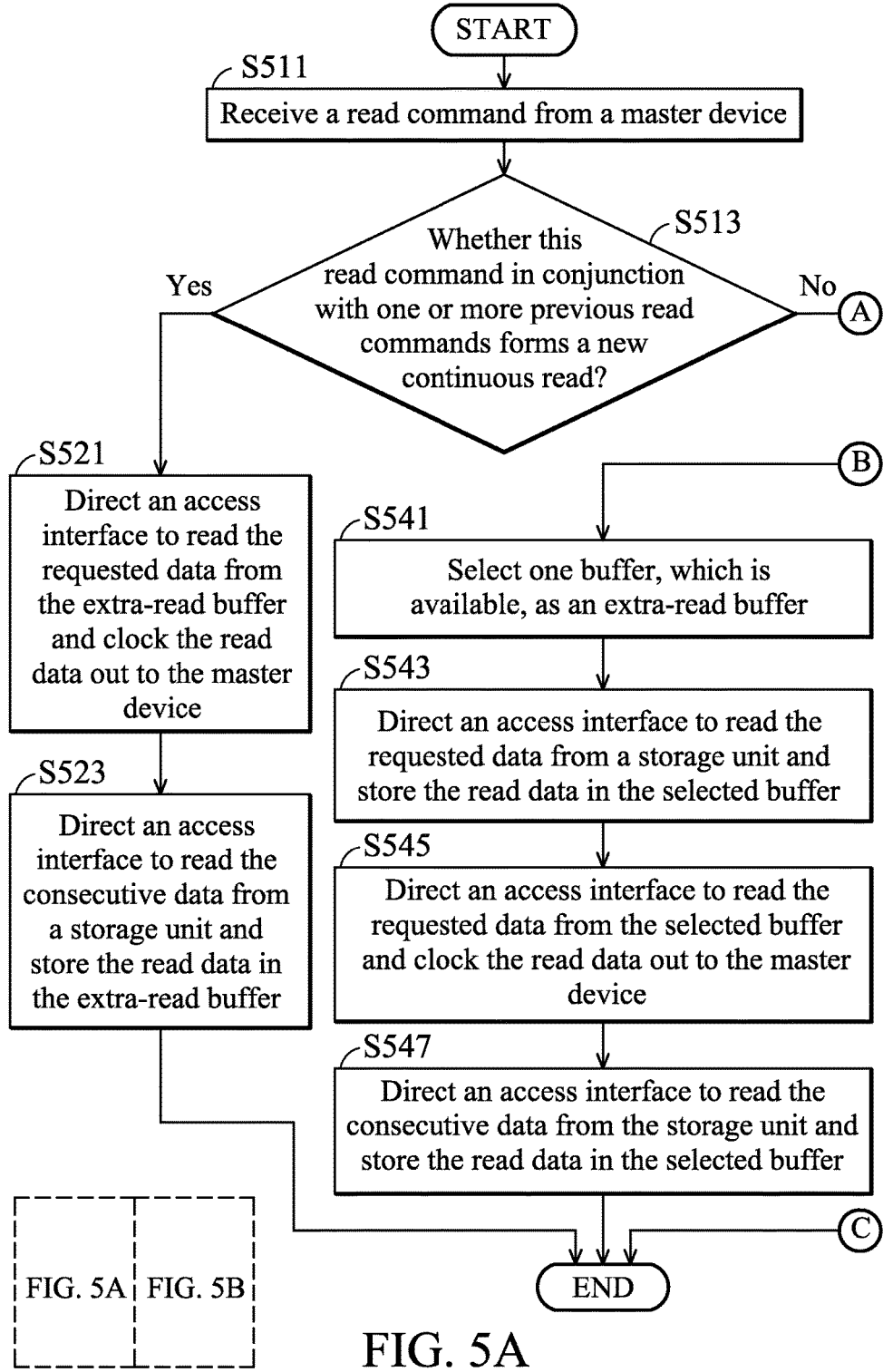
FIGS. 5A and 5B are flowcharts illustrating a method for scheduling logical read commands, performed by a processing unit, according to an embodiment of the invention.
Figure 5B:
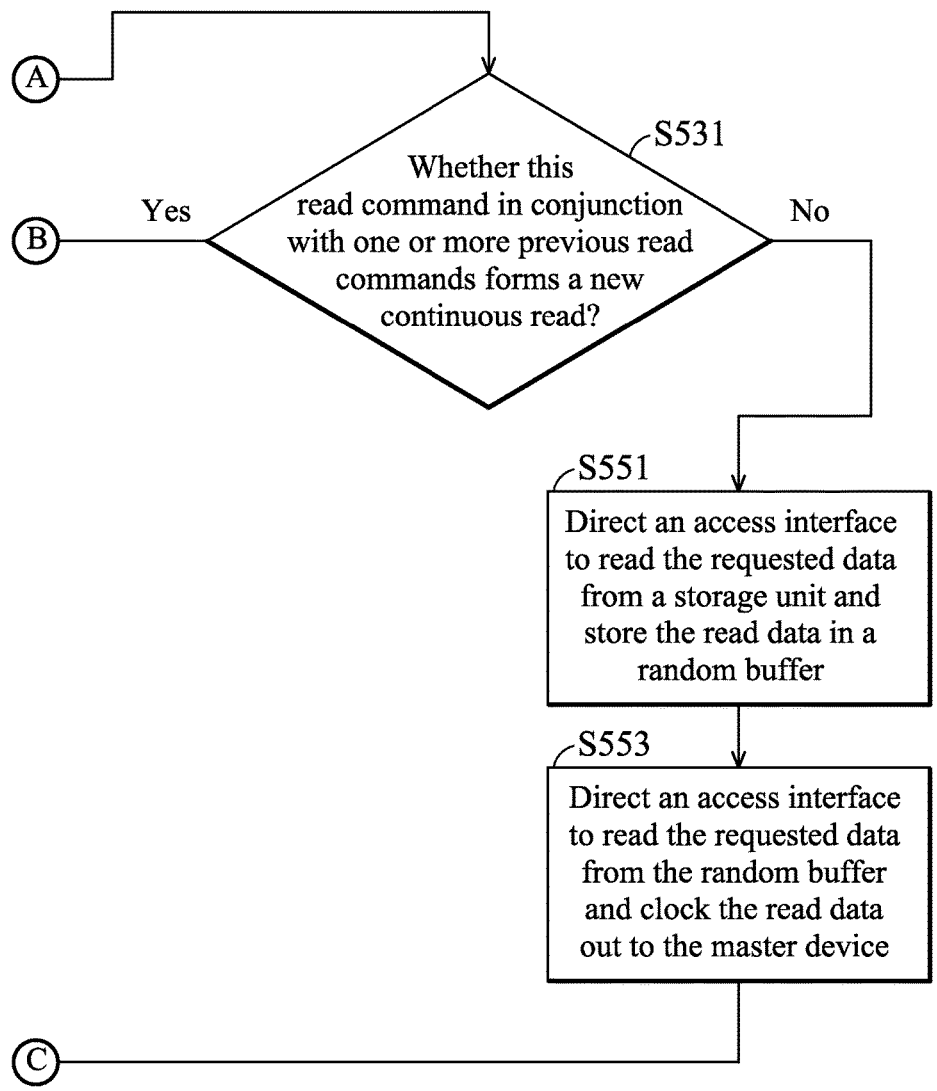

In another embodiment, the system architecture 10 may contain more than two buffers 120_1 and 120_n, where one is configured as a random buffer; the others are configured as extra-read buffers. The DRAM 130 stores information regarding the cached data of each of the random buffer and the extra-read buffers is originally associated with which addresses. FIGS. 5A and 5B are flowcharts illustrating a method for scheduling logical read commands, performed by the processing unit 110, according to an embodiment of the invention. Details of steps S511 to S523 may refer to the descriptions of steps S311 to S323 and are omitted here for brevity. After determining that the requested data has not been stored in any extra-read buffer (the "No" path of step S513), the processing unit 110 further determines whether this read command in conjunction with one or more previous read commands forms a new continuous read (step S531). If so (the "Yes" path of step S531), one buffer, which is available, is selected as an extra-read buffer (step S541), the access interface 170 is directed to read the requested data from the storage unit 180 and store the read data in the selected buffer (step S543), the access interface 150 is directed to read the requested data from the selected buffer and clock the read data out to the master device 160 (step S545) and the access interface 170 is directed to read the consecutive data from the storage unit 180 and store the read data in the selected buffer (step S547). In some embodiments, the determination of step S531 may refer to the information stored in the DRAM 130 and further determine whether the total number of read addresses for this read command in conjunction with one or more previous read commands has exceeded a predetermined threshold. For example, assume that the predetermined threshold is 20: When the information recorded in the DRAM 130 indicates that the random buffer has cached data of LBAs 500 to 515 and the received read command requests data of LBAs 516 to 523, the processing unit 110 determines that a new continuous read is formed. In some embodiments, the determination of step S531 may refer to the information stored in the DRAM 130 and further determine whether data requested by this read command can be joined to the cached data of the random buffer to form a new continuous read. For example, when the information recorded in the DRAM 130 indicates that the random buffer has cached data of LBAs 500 to 507 and the received read command requests data of LBAs 508 to 515, the processing unit 110 determines that a new continuous read is formed. In step S541, the processing unit 110 may select an unused buffer or the buffer with the longest time not to be updated than the other extra-read buffers. Moreover, in step S543, the originally cached data of the selected buffer is overwritten. If data requested by this read command cannot form a new continuous read with any cached data (the "No" path of step S531), the process proceeds to steps S551 and S553. Details of steps S551 to S553 may refer to the descriptions of steps S331 to S333 and are omitted here for brevity. Those skilled in the art will realize that, when more than two buffers are configured as extra-read buffers, the system architecture can support two or more continuous reads performed by two or more execution threads.

Although the embodiment has been described as having specific elements in FIGS. 1 to 2, it should be noted that additional elements may be included to achieve better performance without departing from the spirit of the invention. While the process flows described in FIGS. 3, 5A and 5B each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reading data from a storage unit of a flash memory, performed by a processing unit, comprising:
   receiving a first read command from a master device via a first access interface;
   determining whether data requested by the first read command has been cached in a first buffer, where the first buffer caches continuous data obtained from a storage unit; and
   when data requested by the first read command has not been cached in the first buffer, directing a second access interface to read the data requested by the first read command from the storage unit and store the read data in a second buffer other than the first buffer to avoid the continuous data cached in the first buffer being overwritten, and directing the first access interface to read the data requested by the first read command from the second buffer and clock the read data out to the master device, wherein the first and second buffers are physically separated memories or two continuous spaces of a physical memory, which are logically allocated, wherein the second buffer stores fragment data rather than the continuous data, all blocks of the continuous data are associated with continuous addresses and at least two blocks of the fragment data are associated with discontinuous logical addresses.

2. The method of claim 1, further comprising:
receiving a second read command from the master device via the first access interface;
determining whether data requested by the second read command has been cached in the first buffer; and
when data requested by the second read command has been cached in the first buffer, directing the first access interface to read the data requested by the second read command from the first buffer and clock the read data out to the master device.

3. The method of claim 2, further comprising:
when data requested by the second read command has been cached in the first buffer, directing the second access interface to read consecutive data from the storage unit and store the read data in the first buffer.

4. The method of claim 3, wherein, when data requested by the second read command has been cached in the first buffer, the operation on the first access interface is partially parallel to the operation on the second access interface.

5. The method of claim 2, wherein the reception of the second read command follows the reception of the first read command.

6. The method of claim 1, wherein the determining step further comprises:
checking information stored in a DRAM (Dynamic Random Access Memory) to determine whether data requested by the first read command has been cached in the first buffer.

7. The method of claim 1, further comprising:
when data requested by the first read command has not been cached in the first buffer, determining whether the first read command in conjunction with one or more previous read commands forms a new continuous read; and
when the first read command in conjunction with one or more previous read commands does not form a new continuous read, directing the second access interface to read the data requested by the first read command and store the read data in the second buffer and directing the first access interface to read the data requested by the first read command from the second buffer and clock the read data out to the master device.

8. The method of claim 7, further comprising:
when the first read command in conjunction with one or more previous read commands forms a new continuous read, selecting one of a plurality of buffers as a third buffer, directing the second access interface to read the data requested by the first read command and store the read data in the third buffer and directing the first access interface to read the data requested by the first read command from the third buffer and clock the read data to the master device.

9. The method of claim 8, further comprising:
when the first read command in conjunction with one or more previous read commands forms a new continuous read, directing the second access interface to read consecutive data from the storage unit and store the read data in the third buffer.

10. An apparatus for reading data from a storage unit of a flash memory, comprising:
a first access interface, coupled to a master device;
a second access interface, coupled to a storage unit;
a first buffer, caching continuous data obtained from the storage unit; and
a processing unit, coupled to the first access interface, the second access interface and the first buffer, receiving a first read command from the master device via the first access interface; determining whether data requested by the first read command has been cached in the first buffer; and, when data requested by the first read command has not been cached in the first buffer, directing the second access interface to read the data requested by the first read command from the storage unit and store the read data in a second buffer other than the first buffer to avoid the continuous data cached in the first buffer being overwritten, and directing the first access interface to read the data requested by the first read command from the second buffer and clock the read data out to the master device, wherein the first and second buffers are physically separated memories or two continuous spaces of a physical memory, which are logically allocated, wherein the second buffer stores fragment data rather than the continuous data, all blocks of the continuous data are associated with continuous addresses and at least two blocks of the fragment data are associated with discontinuous logical addresses.

11. The apparatus of claim 10, wherein the processing unit receives a second read command from the master device via the first access interface; determines whether data requested by the second read command has been cached in the first buffer; and, when data requested by the second read command has been cached in the first buffer, directing the first access interface to read the data requested by the second read command from the first buffer and clock the read data out to the master device.

12. The apparatus of claim 11, wherein when data requested by the second read command has been cached in the first buffer, the processing unit directs the second access interface to read consecutive data from the storage unit and store the read data in the first buffer.

13. The apparatus of claim 12, wherein when data requested by the second read command has been cached in the first buffer, the operation on the first access interface is partially parallel to the operation on the second access interface.

14. The apparatus of claim 11, wherein the reception of the second read command follows the reception of the first read command.

15. The apparatus of claim 10, wherein the processing unit checks information stored in a DRAM (Dynamic Random Access Memory) to determine whether data requested by the first read command has been cached in the first buffer.

16. The apparatus of claim 10, wherein the processing unit determines whether the first read command in conjunction with one or more previous read commands forms a new continuous read when data requested by the first read command has not been cached in the first buffer; and directs the second access interface to read the data requested by the first read command and store the read data in the second buffer and directs the first access interface to read the data requested by the first read command from the second buffer and clock the read data out to the master device when the first read command in conjunction with one or more previous read commands does not form a new continuous read.

17. The apparatus of claim 16, wherein the processing unit selects one of a plurality of buffers as a third buffer, directs the second access interface to read the data requested by the first read command and store the read data in the third buffer and directs the first access interface to read the data requested by the first read command from the third buffer and clock the read data to the master device when the first read command in conjunction with one or more previous read commands forms a new continuous read.

18. The apparatus of claim 17 wherein the processing unit directs the second access interface to read consecutive data from the storage unit and store the read data in the third buffer when the first read command in conjunction with one or more previous read commands forms a new continuous read.

* * * * *